UNITED STATES PATENT OFFICE

2,067,631

WELDING ROD

Frederick M. Becket, New York, and Russell Franks, Jackson Heights, N. Y., assignors, by mesne assignments, to Union Carbide and Carbon Corporation, a corporation of New York No Drawing. Application July 28, 1934, Serial No. 737,386

2 Claims. (Cl. 219—8)

The invention is an alloy steel welding rod. Application Serial Number 593,928, filed February 18, 1932, by Frederick M. Becket and Russell Franks jointly, contains a description of chromium-nickel steels containing additions of columbium acting to lessen material loss of corrosion resistance on prolonged holding at elevated temperatures in the neighborhood of 500° C.

We have found that steels containing columbium tend to lose excessive amounts of this constituent when melted by an oxyacetylene torch or an electric arc during welding operations unless the material contains an effective amount of silicon. The following table (A) of test data serves to illustrate this fact. The welds in these tests were made in twelve-gage sheet with one-eighth inch welding rods, using both the electric arc and the oxyacetylene torch methods, employing a suitable flux to protect the metal during welding.

Table A

| Steel No. | Composition of welding rod | | | | | | Method of welding | Composition of deposited weld metal | | |
|---|---|---|---|---|---|---|---|---|---|---|
| | Percent Cr | Percent Ni | Percent Mn | Percent C | Percent Si | Percent Cb | | Percent Cb | Percent Si | Percent C |
| 1 | 18.39 | 8.95 | 0.54 | 0.06 | 0.17 | 0.72 | Oxyacetylene | 0.39 | 0.08 | 0.08 |
| | | | | | | | Electric Arc | 0.28 | | 0.06 |
| 2 | 18.63 | 9.27 | 0.34 | 0.11 | 0.33 | 1.21 | Electric Arc | 0.86 | 0.32 | 0.07 |
| 3 | 18.38 | 8.97 | 0.63 | 0.10 | 0.68 | 1.16 | Oxyacetylene | 1.06 | 0.52 | 0.09 |
| | | | | | | | Electric Arc | 1.09 | 0.58 | 0.08 |
| 4 | 18.68 | 9.27 | 0.67 | 0.12 | 0.91 | 1.63 | Oxyacetylene | 1.65 | 0.78 | 0.20 |
| | | | | | | | Electric Arc | 1.16 | 0.89 | 0.06 |
| 5 | 18.65 | 9.19 | 0.60 | 0.07 | 1.37 | 0.88 | Oxyacetylene | 0.88 | 1.24 | 0.11 |
| | | | | | | | Electric Arc | 0.74 | 0.87 | 0.07 |
| 6 | 18.16 | 8.88 | 0.63 | 0.10 | 1.73 | 1.04 | Oxyacetylene | 0.96 | 1.64 | 0.13 |
| | | | | | | | Electric Arc | 0.91 | 1.54 | 0.09 |
| 7 | 18.35 | 9.08 | 0.62 | 0.09 | 2.23 | 1.09 | Oxyacetylene | 1.07 | 1.90 | 0.12 |
| | | | | | | | Electric Arc | 0.93 | 1.75 | 0.09 |

Examination of these test results reveals that when the silicon content of the rod was only 0.17%, about 50% of the columbium in the original rod was lost during welding. When the rod contained about 0.7% or more silicon, less than 10% of the columbium in the rod was lost.

We have also found that silicon in substantial amounts tends to improve the resistance of certain chromium-nickel-columbium steels to loss of corrosion resistance on prolonged holding at elevated temperatures. The addition of silicon imparts immunity to intergranular corrosion to many steel compositions which, because of a relatively high carbon content or a somewhat low ratio of columbium to carbon, would otherwise not be completely immune. For example, samples of the steels given in Table B were held at several temperatures between 300° C. and 850° C. for various lengths of time, a separate sample being used for each combination of temperature and time. After a sample was held at a given temperature for a given length of time it was boiled in an acidified copper sulfate solution in an attempt to disintegrate it by intergranular corrosion.

Table B

| Steel No. | Analysis | | | | | |
|---|---|---|---|---|---|---|
| | Percent Cr | Percent Ni | Percent Mn | Percent C | Percent Cb | Percent Si |
| 8 | 18.49 | 8.81 | 0.85 | 0.09 | 1.18 | 0.18 |
| 9 | 19.45 | 8.88 | 0.57 | 0.12 | 1.14 | 0.35 |
| 10 | 18.46 | 8.89 | 0.57 | 0.09 | 1.25 | 0.44 |
| 3 | 18.38 | 8.97 | 0.63 | 0.10 | 1.16 | 0.68 |

When subjected to the above described treatment, steels number 8 and 9 disintegrated after they had been heated two weeks at 550° C. and boiled 100 hours. Samples of steel number 10 were sound and not substantially affected after they had been held one month at temperatures of 300° C., 400° C., 475° C., 550° C., 650° C., 750° C., and 850° C., and subsequently boiled for 100 hours. Samples of steel number 3 were sound and not substantially affected after they had been held one month at temperatures of 300° C., 400° C., 475° C., 550° C., 650° C., 750° C., and 850° C., and subsequently boiled for 1000 hours.

The present invention is based on the above described discoveries and is an alloy steel welding rod, comprising about 12% to 30% chromium, about 5% to 30% nickel, about 0.01% to 0.3% carbon, about 0.1% to 3% columbium, about 0.7% to 2% silicon, and the remainder principally iron. Several per cent. manganese and up to about 4% tantalum may also be present. The columbium content should be about eight to ten times the carbon content. The columbium content preferably exceeds the tantalum content.

The welding rod of the invention preferably contains no more than about 2% silicon when the oxyacetylene process is to be used and no more than about 1% silicon when the electric arc process is used.

The steel welding rod of the invention not only provides filler material which may be deposited by welding without an excessive loss of the valuable and essential constituent, columbium, but also provides material deposited by welding, having improved resistance to corrosion after prolonged holding at elevated temperatures in the neighborhood of 500° C.

We claim:

1. A welding rod having substantially the composition: 12% to 30% chromium; 5% to 30% nickel; 0.01% to 0.3% carbon; 0.1% to 3% columbium, the columbium content being at least about eight times the carbon content; 0.7% to 2% silicon; balance substantially all iron.

2. A welding rod having substantially the composition: 12% to 30% chromium; 5% to 30% nickel; 0.01% to 0.3% carbon; 0.1% to 3% columbium, the columbium content being at least about ten times the carbon content; 0.7% to 1% silicon; balance substantially all iron.

FREDERICK M. BECKET.
RUSSELL FRANKS.